(12) United States Patent
Takahashi et al.

(10) Patent No.: US 9,905,887 B2
(45) Date of Patent: Feb. 27, 2018

(54) LITHIUM SECONDARY BATTERY

(71) Applicant: NEC Corporation, Tokyo (JP)

(72) Inventors: Makiko Takahashi, Tokyo (JP); Takehiro Noguchi, Tokyo (JP); Hideaki Sasaki, Tokyo (JP); Yuukou Katou, Tokyo (JP); Akinobu Nakamura, Tokyo (JP)

(73) Assignee: NEC Corporation, Tokyo (JP)

(*) Notice: Subject to any disclaimer, the term of this patent is extended or adjusted under 35 U.S.C. 154(b) by 304 days.

(21) Appl. No.: 14/405,798

(22) PCT Filed: Jun. 4, 2013

(86) PCT No.: PCT/JP2013/065511
§ 371 (c)(1),
(2) Date: Dec. 5, 2014

(87) PCT Pub. No.: WO2013/183655
PCT Pub. Date: Dec. 12, 2013

(65) Prior Publication Data
US 2015/0140443 A1     May 21, 2015

(30) Foreign Application Priority Data

Jun. 5, 2012   (JP) .................................. 2012-128441
Nov. 20, 2012  (JP) .................................. 2012-254758

(51) Int. Cl.
*H01M 10/05*        (2010.01)
*H01M 10/0569*      (2010.01)
(Continued)

(52) U.S. Cl.
CPC ....... *H01M 10/0569* (2013.01); *H01M 4/502* (2013.01); *H01M 4/505* (2013.01);
(Continued)

(58) Field of Classification Search
None
See application file for complete search history.

(56) References Cited

U.S. PATENT DOCUMENTS

2006/0078801 A1    4/2006  Yamaguchi et al.
2007/0224504 A1*   9/2007  Kita ...................... H01M 4/131
                                                   429/231.1
(Continued)

FOREIGN PATENT DOCUMENTS

CN    101030661 A    9/2007
CN    101168262 A    5/2008
(Continued)

OTHER PUBLICATIONS

Machine English translation of JP 2004-087136 A.*
(Continued)

*Primary Examiner* — Scott J Chmielecki
(74) *Attorney, Agent, or Firm* — Finnegan, Henderson, Farabow, Garrett & Dunner, L.L.P.

(57) ABSTRACT

The present invention relates to a secondary battery cg a positive electrode capable of absorbing and releasing lithium, and a electrolyte solution containing a non-aqueous electrolytic solvent, wherein the positive electrode has a positive electrode active material which operates at 4.5 V or more relative to lithium, and wherein the non-aqueous electrolytic solvent contains a sulfone compound represented by a predetermined formula and a fluorinated ether compound represented by a predetermined formula.

21 Claims, 1 Drawing Sheet

(51) Int. Cl.
| | |
|---|---|
| *H01M 4/505* | (2010.01) |
| *H01M 10/052* | (2010.01) |
| *H01M 10/0567* | (2010.01) |
| *H01M 10/0568* | (2010.01) |
| *H01M 4/525* | (2010.01) |
| *H01M 4/50* | (2010.01) |
| *H01M 4/52* | (2010.01) |
| *H01M 4/58* | (2010.01) |
| *H01M 10/04* | (2006.01) |
| *H01M 10/0525* | (2010.01) |

(52) U.S. Cl.
CPC ........... *H01M 4/523* (2013.01); *H01M 4/525* (2013.01); *H01M 4/5825* (2013.01); *H01M 10/04* (2013.01); *H01M 10/052* (2013.01); *H01M 10/0525* (2013.01); *H01M 10/0567* (2013.01); *H01M 10/0568* (2013.01); *H01M 2220/10* (2013.01); *H01M 2220/20* (2013.01); *H01M 2220/30* (2013.01); *H01M 2300/0037* (2013.01); *Y02E 60/122* (2013.01); *Y02P 70/54* (2015.11); *Y02T 10/7011* (2013.01); *Y10T 29/49115* (2015.01)

(56) References Cited

U.S. PATENT DOCUMENTS

| | | | |
|---|---|---|---|
| 2007/0224516 A1 | 9/2007 | Deguchi et al. | |
| 2008/0286652 A1* | 11/2008 | Nazri | H01M 4/38 429/217 |
| 2009/0130551 A1* | 5/2009 | Mori | C01B 3/0047 429/174 |
| 2010/0092869 A1 | 4/2010 | Kaneko et al. | |
| 2011/0053003 A1 | 3/2011 | Deguchi | |
| 2012/0009485 A1 | 1/2012 | Xu et al. | |
| 2012/0028137 A1* | 2/2012 | Chase | H01M 4/382 429/405 |
| 2012/0288753 A1* | 11/2012 | Wietelmann | H01M 4/58 429/188 |
| 2013/0065136 A1 | 3/2013 | Sasaki et al. | |
| 2014/0248529 A1* | 9/2014 | Chen | C01G 53/54 429/163 |

FOREIGN PATENT DOCUMENTS

| | | |
|---|---|---|
| CN | 101394007 A | 3/2009 |
| CN | 101640264 A | 2/2010 |
| CN | 102136604 A | 7/2011 |
| CN | 102306833 A | 1/2012 |
| CN | 102318109 A | 1/2012 |
| CN | 103931040 A | 7/2014 |
| EP | 2 779 297 A1 | 9/2014 |
| JP | 7-249432 | 9/1995 |
| JP | 10-116627 | 5/1998 |
| JP | 2002-33117 | 1/2002 |
| JP | 3304187 B2 | 7/2002 |
| JP | 2003-100342 | 4/2003 |
| JP | 2003-168480 | 6/2003 |
| JP | 2004087136 A * | 3/2004 ........ H01M 10/0525 |
| JP | 3821495 B2 | 9/2006 |
| JP | 3878206 B2 | 2/2007 |
| JP | 2007-287677 | 11/2007 |
| JP | 2009-211822 | 9/2009 |
| JP | 4416991 B2 | 2/2010 |
| JP | 2000-077098 A | 3/2010 |
| JP | 2010-129449 A | 6/2010 |
| JP | 2010-238510 | 10/2010 |
| JP | 2011-187163 A | 9/2011 |
| JP | 2012-94454 A | 5/2012 |
| JP | 4972915 B2 | 7/2012 |
| JP | 2013-030284 A | 2/2013 |
| JP | 2013-093321 A | 5/2013 |
| WO | WO 2006/016733 A1 | 2/2006 |
| WO | WO 2008/133112 A1 | 11/2008 |
| WO | WO 2010/090028 A1 | 8/2010 |
| WO | WO 2011/162169 A1 | 12/2011 |
| WO | WO 2012/005945 A1 | 1/2012 |
| WO | WO 2012/077712 A1 | 6/2012 |
| WO | WO 2012/127717 A1 | 9/2012 |
| WO | WO 2012/132976 A1 | 10/2012 |
| WO | WO 2012/133902 A1 | 10/2012 |
| WO | WO 2012/141301 A1 | 10/2012 |
| WO | WO 2013/069474 A1 | 5/2013 |
| WO | WO 2013/073288 A1 | 5/2013 |
| WO | WO 2013/129428 A1 | 9/2013 |
| WO | WO 2013/183655 A1 | 12/2013 |

OTHER PUBLICATIONS

M.Q. Xu et al., "Performance improvement of lithium ion battery using PC as a solvent component and BS as an SEI forming additive", Journal of Power Sources, Elsevier SA, CH, vol. 174, No. 2, pp. 705-710, Dec. 2007.

H.B. Han et al., "Lithium bis(fluorosulfonyl)imide (LiFSI) as conducting salt for nonaqueous liquid electrolytes for lithium-ion batteries: Physicochemical and electrochemical properties", Journal of Power Sources, Elsevier SA, CH, vol. 196, No. 7, pp. 3623-3632, Dec. 2010.

Z. Chen et al., "Methods to obtain excellent capacity retention in $LiCoO_2$ cycled to 4.5 V", Electrochimicia Acta, Elsevier Science Publishers, Barking, GB, vol. 49, No. 7, pp. 1079-1090, Mar. 2004.

Extended European Search Report dated Jan. 14, 2016 by the European Patent Office in counterpart European Patent Application No. 13799816.7.

Chinese Office Action issued by the Chinese Patent Office in counterpart Chinese Patent Application No. 201380029910.6, dated Feb. 24, 2016.

A. Cresce et al., "Electrolyte Additive in Support of 5 V Li Ion Chemistry", Journal of the Electrochemical Society, Electrochemical Society; The Institution of Electrical Engineers, Stevenage, GB, vol. 158, No. 3, pp. A337-A342, 2011.

Extended European Search Report dated Apr. 20, 2016 by the European Patent Office in counterpart European Patent Application No. 13856347.3.

Chinese Office Action issued by the Chinese Patent Office in counterpart Chinese Patent Application No. 201380060674.4, dated Jul. 6, 2016.

International Search Report dated Aug. 20, 2013 in corresponding PCT International application.

Non-Final Office Action dated Jul. 21, 2016, in U.S. Appl. No. 14/443,719.

International Search Report issued by the Japanese Patent Office in related International Application No. PCT/JP2013/081086, dated Feb. 18, 2014.

Written Opinion dated Jun. 4, 2015, in related PCT International Application No. PCT/JP2013/081086.

Written Opinion dated Jun. 4, 2015, in related PCT International Application No. PCT/JP2013/081085.

Notification to Grant Patent Right for Invention issued by The State Intellectual Property Office of the People's Republic of China Patent Office in counterpart Chinese Patent Application No. 201380029910.6, dated Jul. 10, 2017.

* cited by examiner

LITHIUM SECONDARY BATTERY

CROSS-REFERENCE TO RELATED PATENT APPLICATIONS

This application is a National Stage Entry of International Application No. PCT/JP2013/065511, filed Jun. 4, 2013, which claims priority from Japanese Patent Application Nos. 2012-128441, filed Jun. 5, 2012 and 2012-254758, filed Nov. 20, 2012. The entire contents of the above-referenced applications are expressly incorporated herein by reference.

TECHNICAL FIELD

The present invention relates to a secondary battery, particularly a lithium ion secondary battery.

BACKGROUND ART

Lithium ion secondary batteries, which have small size and large capacity, have been widely used as power supplies for electronic devices such as mobile phones and notebook computers and have contributed to enhancing convenience of mobile IT devices. Attention is now drawn to use of such batteries in large-scale applications, for example, power sources for automobiles and the like, and power storage devices for smart grid.

It is urgent to further increase the energy density of lithium ion secondary batteries, and examples of the process to increase the energy density include a process of using active materials having large capacity, a process of increasing the operating potentials of batteries, and a process of enhancing the charge/discharge efficiency, cycle life and the like. Among these, the process of increasing the operating potentials of the battery is a measure effective for size and weight reduction of battery modules used in electric vehicles and the like because the process can provide fewer numbers of battery packs in series than conventional battery packs.

Materials having a 4-V class operating potential (average operating potential=3.6 to 3.8 V: versus the lithium potential) such as lithium cobalt oxide and lithium manganese oxide are used as positive electrode active materials for lithium ion secondary batteries. This is because the redox reaction of Co ions or Mn ions ($Co^{3+}$<->$Co^{4+}$ or $Mn^{3+}$<->$Mn^{4+}$) regulates a developed potential. In contrast, it is known that, for example, a compound in which Mn of spinel lithium manganese oxide is substituted with Ni, Co, Fe, Cu, Cr and the like as the active material presents a 5-V class operating potential (average operating potential=4.6 V or more: versus the lithium potential). As Mn exists in the tetravalent state in such a compound, the redox of the substituted element, instead of the redox reaction of Mn, regulates the operating potential.

$LiNi_{0.5}Mn_{1.5}O_4$, for example, has capacity of 130 mAh/g or more, an average operating potential of 4.6 V or more versus Li metal, and can be expected as a material having a high energy density. Additionally, spinel lithium manganese oxide, which has three-dimensional paths for diffusing lithium, has advantages superior to other compounds, such as excellent thermodynamical stability, ease of synthesis, relatively inexpensive raw materials, and abundant resources.

In contrast, use of a 5-V class positive electrode notably causes problems due to decomposition of electrolyte solutions, such as gas evolution and a drop in capacity in long-term cycles and under high-temperature conditions. In order to prevent electrolyte solutions from decomposing, development of electrolyte solutions highly resistant to oxidation is proceeding.

Patent Literatures 1 and 2 describe a secondary battery in which fluorinated compounds, such as fluorinated ethers, fluorinated carbonate esters, fluorinated esters, fluorinated acrylates, and fluorinated cyclic carbonates are employed as the solvent when a positive electrode active material which exhibits a charge/discharge region of 4.5 V or more is employed.

Patent Literatures 4 and 5 describe a secondary battery in which an electrolyte solution containing a sulfone compound and a fluorinated solvent is employed.

As described above, examples of electrolyte solution containing fluorinated ethers or sulfone compounds have been already disclosed. However, Patent Literatures 1 and 2 describe no examples in which a fluorinated solvent and a sulfone compound are mixed. Patent Literature 3 exemplifies an electrolyte solution which is a combination of sulfolane and a carbonate ester, but does not describe fluorinated ethers. Patent Literatures 4 and 5 exemplify an electrolyte solution which is a mixture of a fluorinated ether and sulfolane, but describe no effect relating to e.g. suppression of gas evolved from decomposition of the electrolyte solution, which is a problem inherent to 5-V class positive electrodes, because all the positive electrodes employed therein are 4-V class positive electrodes such as lithium cobalt oxide.

CITATION LIST

Patent Literatures

Patent Literature 1: Japanese Patent Laid-Open No. 2003-100342
Patent Literature 2: Japanese Patent Laid-Open No. 2003-168480
Patent Literature 3: Japanese Patent Laid-Open No. 2002-033117
Patent Literature 4: Japanese Patent Laid-Open No. 2007-287677
Patent Literature 5: Japanese Patent Laid-Open No. 2009-211822

SUMMARY OF INVENTION

Technical Problem

In use of a positive electrode active material which operates at a high potential, decomposition of an electrolyte solution occurs in a portion where a positive electrode comes in contact with the electrolyte solution, leading to problems, such as gas evolution from decomposition products and decreases in the charge/discharge cycling characteristics. Particularly, lithium ion secondary batteries, which employ a positive electrode active material exhibiting a high potential of 4.5 V or more, have not achieved satisfactory performance in cycling characteristics at a high temperature, such as 45° C. or more and gas evolution.

An object of the present embodiment is, thus, to provide a secondary battery which has a positive electrode active material which operates at a high potential of 4.5 V or more, and has satisfactory cycling characteristics and low gas evolution.

Solution to Problem

One embodiment of the present invention is a secondary battery (preferably a lithium ion secondary battery) which includes a positive electrode capable of absorbing and releasing lithium, and a electrolyte solution comprising a non-aqueous electrolytic solvent, wherein the positive electrode has a positive electrode active material which operates at 4.5 V or more versus lithium, and wherein the non-aqueous electrolytic solvent contains a sulfone compound represented by the following Formula (1) and a fluorinated ether compound represented by the following Formula (2):

(1)

(in Formula (1), $R_1$ and $R_2$ each independently represent substituted or unsubstituted alkyl group, and a carbon atom of $R_1$ and a carbon atom of $R_2$ may be bonded through a single bond or double bond to form a cyclic structure.)

(2)

(in Formula (2), $R_1$ and $R_2$ each independently represent alkyl group or fluorinated alkyl group, and at least one of $R_1$ and $R_2$ is fluorinated alkyl group.).

Advantageous Effect of Invention

The present embodiment can provide a secondary battery which employs a positive electrode material exhibiting a high potential of 4.5 V or more, wherein the secondary battery improves a drop in capacity in cycles and suppresses gas evolution in high temperature cycles.

DESCRIPTION OF EMBODIMENT

A secondary battery according to the present embodiment includes a positive electrode capable of absorbing and releasing lithium, and an electrolyte solution containing a non-aqueous electrolytic solvent. Additionally, the positive electrode has a positive electrode active material which operates at a potential of 4.5 V or more versus lithium. The non-aqueous electrolytic solvent contains a sulfone compound represented by Formula (1) and a fluorinated ether compound represented by Formula (2).
[Electrolyte Solution]

An electrolyte solution according to the present embodiment contains a sulfone compound represented by Formula (1) and a fluorinated ether compound represented by Formula (2), as a non-aqueous electrolytic solvent.

Whereas a fluorinated ether compound is a solvent having high oxidation resistance, it has a low dielectric constant. Also, when it is used singly, it cannot dissolve lithium salts such as $LiPF_6$, and thus it needs to be mixed with a solvent having a high dielectric constant. Although examples of the solvent having a high dielectric constant include cyclic carbonate esters, the compatibility between a fluorinated ether and a cyclic carbonate ester is poor, leading to problems such as an increase in viscosity and precipitation of supporting electrolytes.

Sulfone compounds have a relatively high dielectric constant, and are more excellent in oxidation resistance than cyclic carbonate esters, it can dissolve supporting electrolytes in a wide composition range with fluorinated ether compounds. Since both sulfone compounds and fluorinated ether compounds have excellent oxidation resistance, gas evolution in high-temperature cycles can be greatly suppressed. In addition, in the present embodiment, a carbonate ester compound may be further added to the fluorinated ether compound and sulfone compound and thereby can further enhance the cycling characteristics.

In the present embodiment, a sulfone compound is represented by the following Formula (1) (hereinbelow, "a sulfone compound represented by Formula (1)" may be simply described as "a sulfone compound"):

(1)

(in Formula (1), $R_1$ and $R_2$ each independently represent substituted or unsubstituted alkyl group, and a carbon atom of $R_1$ and a carbon atom of $R_2$ may be bonded through a single bond or double bond to form a cyclic structure.)

In the sulfone compound represented by Formula (1), the number of carbon atoms $n_1$ of $R_1$, and the number of carbon atoms $n_2$ of $R_2$, are respectively preferably $1 \le n_1 \le 12$ and $1 \le n_2 \le 12$, more preferably $1 \le n_1 \le 6$ and $1 \le n_2 \le 6$, and still more preferably $1 \le n_1 \le 3$ and $1 \le n_2 \le 3$. The alkyl group also includes straight-chain, branched-chain, and cyclic ones.

Examples of the substituent in $R_1$ and $R_2$ include alkyl groups having 1 to 6 carbon atoms (for example, a methyl group, ethyl group, propyl group, isopropyl group, butyl group, and isobutyl group), aryl groups having 6 to 10 carbon atoms (for example, phenyl group and naphthyl group), and halogen atoms (for example, a chlorine atom, bromine atom, and fluorine atom).

Alternatively, the sulfone compound is preferably a cyclic sulfone compound represented by the following Formula (7-1):

(7-1)

(in Formula (7-1), $R_3$ represents substituted or unsubstituted alkylene group.)

The alkylene group in $R_3$ has preferably 4 to 9 carbon atoms and more preferably 4 to 6 carbon atoms.

Examples of the substituent in $R_3$ include alkyl groups having 1 to 6 carbon atoms (for example, methyl group, ethyl group, propyl group, isopropyl group, and butyl group), and halogen atoms (for example, a chlorine atom, bromine atom, and fluorine atom).

Alternatively, the cyclic sulfone compound is more preferably a compound represented by the following Formula (7-2):

(in Formula (7-2), m is an integer of 1 to 6.)

In Formula (7-2), m is an integer of 1 to 6 and preferably an integer of 1 to 3.

Examples of the cyclic sulfone compound represented by Formula (7-1) preferably include tetramethylene sulfone, pentamethylene sulfone, and hexamethylene sulfone. Alternatively, examples of the cyclic sulfone compound having a substituent preferably include 3-methylsulfolane and 2,4-dimethylsulfolane. These materials have a compatibility with fluorinated ether compounds as well as a relatively high dielectric constant, and thus advantageously have an excellent effect of dissolving/dissociating lithium salts.

Alternatively, the sulfone compound may be chain sulfone compounds. Examples of the chain sulfone compound include ethylmethylsulfone, ethylisopropylsulfone, ethylisobutylsulfone, dimethylsulfone, and diethylsulfone. Among these, ethylmethylsulfone, ethylisopropylsulfone, and ethylisobutylsulfone are preferred. These materials have a compatibility with fluorinated ether compounds as well as a relatively high dielectric constant, and thus advantageously have an excellent effect of dissolving/dissociating lithium salts.

Sulfone compounds may be used singly, and also preferably used in combination of two or more. When the solvent contains two or more sulfone compounds, a cyclic sulfone compound and a chain sulfone compound may be used in combination, for example, a combination of sulfolane and ethylmethyl sulfone and a combination of sulfolane and dimethyl sulfone may be included.

The content of the sulfone compound in the non-aqueous electrolytic solvent is preferably 5% by volume or more and 75% by volume or less, more preferably 5% by volume or more and 50% by volume or less, more preferably 5% by volume or more and less than 50% by volume, more preferably 5% by volume or more and 40% by volume or less, and still more preferably 5% by volume or more and 30% by volume or less. Containing too small of the sulfone compound may decrease the compatibility of the electrolyte solution, whereas containing too much of the sulfone compound may increase the viscosity of the electrolyte solution and elicit a drop in capacity of the cycling characteristics at room temperature.

In the present embodiment, the fluorinated ether compound is represented by the following Formula (2) (hereinbelow, "a fluorinated ether compound represented by Formula (2)" may be simply described as "a fluorinated ether."):

$$R_1—O—R_2 \qquad (2)$$

(in Formula (2), $R_1$ and $R_2$ each independently represent alkyl group or fluorinated alkyl group, and at least one of $R_1$ and $R_2$ is fluorinated alkyl group.)

Additionally, the total number of the carbon atoms in $R_1$ and $R_2$ is preferably 10 or less.

Alternatively, the content of the fluorine atoms in the fluorinated alkyl group in Formula (2) is preferably 50% or more and more preferably 60% or more based on the total of the fluorine atoms and hydrogen atoms. A large content of the fluorine atoms further increases the voltage resistance to thereby make it possible to reduce deterioration of the battery capacity after cycling more effectively even when a positive electrode active material which operates at a potential of 4.5 V or more versus lithium is used.

Examples of the fluorinated ether compound include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$, $H(CF_2)_2CH_2OCF_2CHFCF_3$, $F(CF_2)_2CH_2OCF_2CHFCF_3$, $H(CF_2)_4CH_2O(CF_2)H$, $CF_3OCH_2(CF_2)_2F$, $CF_3CHFCF_2OCH_2(CF_2)_3F$, $CH_3CF_2OCH_2(CF_2)_2F$, $CH_3CF_2OCH_2(CF_2)_3F$, $CH_3O(CF_2)_5F$, $F(CF_2)_3CH_2OCH_2(CF_2)_3F$, $F(CF_2)_2CH_2OCH_2(CF_2)_2F$, $H(CF_2)_2CH_2OCH_2(CF_2)_2H$, and $CH_3CF_2OCH_2(CF_2)_2H$.

Among the fluorinated ether compounds, a fluorinated ether compound represented by the following Formula (8-1) is more preferred:

$$X^1—(CX^2X^3)_n—O—(CX^4X^5)_m—X^6 \qquad (8-1)$$

(in Formula (8-1), n and m are each independently 1 to 8. $X^1$ to $X^6$ each independently represent a fluorine atom or hydrogen atom, provided that at least one of $X^1$ to $X^3$ is a fluorine atom, and at least one of $X^4$ to $X^6$ is a fluorine atom. When n is 2 or more, $X^2$ and $X^3$, which are plural, are independent from each other, and when m is 2 or more, $X^4$ and $X^5$, which are plural, are independent from each other.)

The fluorinated ether compound is more preferably a compound represented by the following Formula (8-2) from the viewpoint of the voltage resistance and the compatibility with other electrolytes:

$$X^1—(CX^2X^3)_n—CH_2O—CX^4X^5—CX^6X^7—X^8 \qquad (8-2)$$

(in Formula (8-2), n is 1 to 8, and $X^1$ to $X^8$ are each independently a fluorine atom or hydrogen atom, provided that at least one of $X^1$ to $X^3$ is a fluorine atom, and at least one of $X^4$ to $X^8$ is a fluorine atom.)

In Formula (8-2), when n is 2 or more, $X^2$, which is plural, may be the same or different from each other, and $X^3$, which is plural, may be the same or different from each other.

Furthermore, the fluorinated ether compound is more preferably represented by the following Formula (8-3) from the viewpoint of the voltage resistance and the compatibility with other electrolytes:

$$H-(CY^1Y^2-CY^3Y^4)_n—CH_2O-CY^5Y^6-CY^7Y^8-H \qquad (8-3)$$

In Formula (8-3), n is 1, 2, 3, or 4. $Y^1$ to $Y^8$ each independently represent a fluorine atom or hydrogen atom, provided that at least one of $Y^1$ to $Y^4$ is a fluorine atom, and at least one of $Y^5$ to $Y^8$ is a fluorine atom.

In Formula (8-3), when n is 2 or more, $Y^1$ to $Y^4$, which are plural, may be the same or different from each other.

The content of fluorinated ether compound in the non-aqueous electrolytic solvent is preferably 5% by volume or more and 90% by volume or less, preferably 15% by volume or more and 90% by volume or less, more preferably 40% by volume or more and 90% by volume or less, more preferably 50% by volume or more and 90% by volume or less, still more preferably 50% by volume or more and 80% by volume or less. Containing too small of the fluorinated ether compound may increase the viscosity of the electrolyte solution to thereby decrease the electrical conductivity and elicit a drop in capacity in the cycles. Containing too much of fluorinated ether compound induces the decrease of the dielectric constant of the electrolyte solution and thereby the supporting electrolyte becomes impossible to dissociate, a drop in capacity may be occurred as well. It should be noted that the fluorinated ether compound may be used singly or two or more of the fluorinated ethers may be used in mixture.

In the present embodiment, the electrolyte solution preferably further contains at least one selected from a carbonate ester compound represented by the following Formula (3), a fluorinated carboxylate ester represented by the following Formula (A), a cyclic sulfonate ester represented by the following Formula (9), and a compound containing an $N(SO_2F)_2$ anion (FSI anion) represented by Formula (B), in addition to the sulfone compound and fluorinated ether described above. In the present specification, a carbonate ester compound represented by Formula (3) may be simply described as "a carbonate ester compound," a fluorinated carboxylate ester represented by Formula (A) may be simply described as "a fluorinated carboxylate ester" or "a chain fluorinated carboxylate ester", a cyclic sulfonate ester represented by Formula (9) may be simply described as "a cyclic sulfonate ester", and an $N(SO_2F)_2$ anion represented by Formula (B) may be simply described as "an FSI anion":

(3)

(in Formula (3), $R_1$ and $R_2$ each independently represent substituted or unsubstituted alkyl group. A carbon atom of $R_1$ and a carbon atom of $R_2$ may be bonded through a single bond or double bond to form a cyclic structure.)

(A)

(in Formula (A), $R_1$ and $R_2$ each independently represent substituted or unsubstituted alkyl group, and at least one of $R_1$ and $R_2$ is fluorine-substituted alkyl group.)

(9)

(in Formula (9), A and B each independently represent alkylene group or fluorinated alkylene group. X represents a single bond or —$OSO_2$— group.)

(B)

Compounds containing the carbonate ester compound, fluorinated carboxylate ester compound, cyclic sulfonate ester compound, and $N(SO_2F)_2$ anion (FSI anion) described above each have an effect of forming a film on the positive electrode, the negative electrode, or both, and thus, incorporation of these compounds can enhance the cycling characteristics of the lithium ion secondary battery.

Of the compounds described above, containing a carbonate ester compound in the non-aqueous electrolytic solvent increases the ion dissociation degree of the electrolyte solution as well as decreases the viscosity of the electrolyte solution. Thus, the ion mobility can be improved in addition to the film-forming effect.

Each compound will be described hereinbelow.

In the present embodiment, the non-aqueous electrolytic solvent may contain a carbonate ester compound represented by Formula (3):

(in Formula (3), $R_1$ and $R_2$ each independently represent substituted or unsubstituted alkyl group. A carbon atom of $R_1$ and a carbon atom of $R_2$ may be bonded through a single bond or double bond to form a cyclic structure.)

In Formula (3), when $R_1$ and/or $R_2$ are substituted alkyl groups, examples of the substituent preferably include halogen atoms (for example, chlorine atoms, bromine atoms, and fluorine atoms), and a fluorine atom is preferred.

Examples of the carbonate ester compound include cyclic carbonates and chain carbonates. Examples of the carbonate ester compound include ethylene carbonate (EC), propylene carbonate (PC), butylene carbonate (BC), vinylene carbonate (VC), dimethyl carbonate (DMC), diethyl carbonate (DEC), ethyl methyl carbonate (MEC), dipropyl carbonate (DPC), and a part or all of the hydrogen in these alkyl groups or alkylene groups may be substituted with a halogen atom, preferably a fluorine atom. Examples of the fluorinated cyclic carbonate which can be used include 4-fluoro-1,3-dioxolane-2-one{monofluoroethylene carbonate (FEC)}, (cis or trans)4,5-difluoro-1,3-dioxolane-2-one, 4,4-difluoro-1,3-dioxolane-2-one, and 4-fluoro-5-methyl-1,3-dioxolane-2-one. Among these, FEC is more preferred.

The carbonate ester compound may be used singly or two or more of the carbonate ester compounds may be used in mixture. Among the carbonate ester compound mentioned above, at least ethylene carbonate (EC) and/or propylene carbonate (PC), which are cyclic carbonates, are preferably contained. Chain carbonates such as dimethyl carbonate (DMC), diethyl carbonate (DEC), and methylethyl carbonate (MEC) may be further contained other than EC and PC.

The content of the carbonate ester compound in the total non-aqueous electrolytic solvent may be 0% by volume, but is preferably from 1 to 40% by volume, more preferably from 5 to 30% by volume, and still more preferably from 10 to 30% by volume. Containing too small of the carbonate ester compound may decrease the electrical conductivity of the electrolyte solution to thereby degrade the cycling characteristics. Containing too much of the carbonate ester compound may increase gas evolution because carbonate ester compounds are easier to decompose at a high potential than sulfone compounds and fluorinated ether compounds.

In the present embodiment, the non-aqueous electrolytic solvent may contain a fluorinated carboxylate ester represented by Formula (A):

(A)

(in Formula (A), $R_1$ and $R_2$ each independently represent substituted or unsubstituted alkyl group, and at least one of $R_1$ and $R_2$ is fluorine-substituted alkyl group.)

In $R_1$ and $R_2$ in Formula (A), the substituted or unsubstituted alkyl group each independently has preferably 1 to 12 carbon atoms, more preferably 1 to 8 carbon atoms, still more preferably 1 to 6 carbon atoms, and particularly preferably 1 to 4 carbon atoms. In $R_1$ and $R_2$ in Formula (A), examples of the substituent include halogen atoms (for example, a chlorine atom, bromine atom, and fluorine atom), and a fluorine atom is preferred. It should be noted that the substituted or unsubstituted alkyl groups in Formula (A) include straight-chain, branched-chain, and cyclic ones.

In Formula (A), fluorine-substituted alkyl group represents substituted alkyl group having a structure in which at least one hydrogen atom in unsubstituted alkyl group is substituted with a fluorine atom. In Formula (A), the fluorine-substituted alkyl group is preferably straight-chain alkyl group.

In Formula (A), $R_1$ and $R_2$ are each independently fluorine-substituted alkyl group, for example. Alternatively, in Formula (A), $R_1$ is alkyl group, and $R_2$ is fluorine-substituted alkyl group, for example. Alternatively, in Formula (A), $R_1$ is fluorine-substituted alkyl group, and $R_2$ is alkyl group, for example.

The chain fluorinated carboxylate ester compound is preferably a compound represented by the following (A-1):

$$F(CZ^1Z^2)_n COO(CZ^3Z^4)_m CH_3 \tag{A-1}$$

(in Formula (A-1), n is 1 to 4, m is 0 to 4, $Z^1$ to $Z^4$ are each independently a fluorine atom or hydrogen atom, provided that at least one of $Z^1$ to $Z^2$ is a fluorine atom.)

In Formula (A-1), when n is 2 or more, $Z^1$ and $Z^2$ may be each independent depending on the carbon atom to which they are bonded. Alternatively, when m is 2 or more, $Z^3$ and $Z^4$ may be each independent depending on the carbon atom to which they are bonded.

The chain fluorinated carboxylate ester compound may be used singly or two or more of the chain fluorinated carboxylate esters may be used in mixture.

Examples of the fluorinated carboxylate ester specifically include ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, ethyl trifluoroacetate, and ethyl 3,3,3-trifluoropropionate. Among these, methyl-2,2,3,3-tetrafluoropropionate (TFMP) is preferred.

The content of the chain fluorinated carboxylate ester compound in the electrolyte solution is, but is not particularly limited to, from 0.01 to 70% by volume and more preferably from 0.1 to 50% by volume, for example. When the content of the chain fluorinated carboxylate ester compound is set to 0.01% by volume or more, it is believed that a film on the negative electrode surface can be effectively formed to thereby more effectively suppress decomposition of the electrolyte solution. In contrast, when the content of the chain fluorinated carboxylate ester compound is set to 70% by volume or less, it is believed that an increase in the internal resistance in the battery due to excess formation of an SEI film, which is expected to be provided by the chain fluorinated carboxylate ester compound, can be suppressed.

In the present embodiment, the electrolyte solution may contain a cyclic sulfonate ester compound represented by the following Formula (9):

(9)

(in Formula (9), A and B each independently represent alkylene group or fluorinated alkylene group. X represents a single bond or $-OSO_2-$ group.)

In Formula (9), the alkylene group has, for example, 1 to 8 carbon atoms, preferably 1 to 6 carbon atoms, and more preferably 1 to 4 carbon atoms.

Fluorinated alkylene group denotes substituted alkylene group having a structure in which at least one hydrogen atom in unsubstituted alkylene group is substituted with a fluorine atom. In Formula (9), the fluorinated alkylene group has, for example, 1 to 8 carbon atoms, preferably 1 to 6 carbon atoms, and more preferably 1 to 4 carbon atoms.

In addition, the $-OSO_2-$ group may be in either direction.

In Formula (9), when X is a single bond, the cyclic sulfonate ester is a cyclic monosulfonate ester, and the cyclic monosulfonate ester is preferably a compound represented by the following Formula (10-1):

(10-1)

(in Formula (10-1), $R_{101}$ and $R_{102}$ each independently represent a hydrogen atom, a fluorine atom or alkyl group having 1 to 4 carbon atoms. n is 0, 1, 2, 3, or 4.)

In Formula (9), when X is $-OSO_2-$ group, the cyclic sulfonate ester is a cyclic disulfonate ester, and the cyclic disulfonate ester is preferably a compound represented by the following Formula (10-2):

(10-2)

(In Formula (10-2), $R_{201}$ to $R_{204}$ each independently represent a hydrogen atom, fluorine atom, or alkyl group having 1 to 4 carbon atoms. n is 1, 2, 3, or 4. When n is 2 or more, $R_{203}$, which is plural, may be the same or different from each other, and $R_{204}$, which is plural, may be the same or different from each other.)

Examples of the cyclic sulfonate ester include monosulfonate esters such as 1,3-propanesultone, 1,2-propanesultone, 1,4-butanesultone, 1,2-butanesultone, 1,3-butanesultone, 2,4-butanesultone, and 1,3-pentanesultone (when X in Formula (9) is a single bond), and disulfonate esters such as methylene methane disulfonate ester and ethylene methane disulfonate ester (when X in Formula (9) is —$OSO_2$— group). Among these, 1,3-propanesultone, 1,4-butanesultone, and methylene methane disulfonate ester are preferred from the viewpoint of the film-forming effect, availability, and cost.

The content of the cyclic sulfonate ester in the electrolyte solution may be 0% by mass, but it is preferably from 0.01 to 10% by mass, more preferably from 0.1 to 5% by mass, and still more preferably from 0.3 to 3% by mass. When the content of the cyclic sulfonate ester is 0.01% by mass or more, a film on the positive electrode surface can be more effectively formed to thereby suppress decomposition of the electrolyte solution. When the content of the cyclic sulfonate ester is 10% by mass or less, the viscosity and electrical conductivity of the electrolyte solution can be adjusted within a more appropriate range to thereby secure an initial capacity close to the theoretical capacity by charging at 20° C.

In the present embodiment, the electrolyte solution may contain a compound containing an FSI anion represented by the following Formula (B):

(B)

The compound containing an $N(SO_2F)_2$ anion (FSI anion) represented by Formula (B) is preferably a compound containing an FSI anion represented by Formula (B1):

(B1)

(in Formula (B1), M represents a metal ion) and the compound is dissolved in a non-aqueous electrolyte solution to thereby form an FSI anion. The compound containing an FSI anion is preferably a salt of an FSI anion and alkali metal, and examples of the salt include LiFSI, NaFSI, and KFSI. Among these, LiFSI is more preferred because it also serves as an electrolyte of lithium ion batteries, facilitating enhancement of the ion conductivity of the electrolyte solution.

The content of the compound containing an FSI anion in the electrolyte solution may be 0% by mass, but it is preferably from 0.1 to 5% by mass, more preferably from 0.2 to 3% by mass, and still more preferably from 0.3 to 2% by mass. An extremely low content may result in an insufficient effect for a film, whereas an extremely high content may cause extra additives to react on the positive electrode to be a source of gas evolution.

In the present embodiment, a fluorinated phosphate ester represented by the following Formula (C) may be contained as a non-aqueous solvent in the electrolyte solution:

(C)

(in Formula (C), $R^1$, $R^2$, and $R^3$ each independently represent substituted or unsubstituted alkyl group, and at least one of $R^1$, $R^2$, and $R^3$ is fluorine-substituted alkyl group. A carbon atom of $R^1$ and a carbon atom of $R^2$ may be bonded through a single bond or double bond to form a cyclic structure.)

In Formula (C), $R^1$, $R^2$, and $R^3$ each independently and preferably have 1 to 3 carbon atoms. At least one of $R^1$, $R^2$, and $R^3$ is preferably fluorine-substituted alkyl group in which 50% or more of hydrogen atoms in the corresponding unsubstituted alkyl group are substituted with a fluorine atom. More preferably, all the $R^1$, $R^2$, and $R^3$ are fluorine-substituted alkyl group, and the $R^1$, $R^2$, and $R^3$ are fluorine-substituted alkyl group in which 50% or more of hydrogen atoms in the corresponding unsubstituted alkyl group are each substituted with a fluorine atom. This is because a large content of the fluorine atoms further increases the voltage resistance, and even when a positive electrode active material which operates at a potential of 4.5 V or more versus lithium is used, it can further decrease capacity deterioration of the battery after cycling. Additionally, the proportion of the number of the fluorine atoms to the total number of hydrogen atoms and fluorine atoms in the fluorine-substituted alkyl group is preferably 55% or more.

Examples of the fluorinated phosphate ester include, but are not particularly limited to, fluorinated alkyl phosphate ester compounds, such as Tris (trifluoromethyl) phosphate, Tris (pentafluoroethyl) phosphate, Tris (2,2,2-trifluoroethyl) phosphate (TTFP), Tris (2,2,3,3-tetrafluoropropyl) phosphate, Tris (3,3,3-trifluoropropyl) phosphate, and Tris (2,2,3,3,3-pentafluoropropyl) phosphate. Among these, as the fluorinated phosphate ester compound, tris(2,2,2-trifluoroethyl)phosphate (TTFP) is preferred. The fluorinated phosphate ester may be used singly or in combination of two or more.

The higher the content of the fluorinated phosphate ester contained in the non-aqueous electrolytic solvent is, the more enhanced is the oxidation resistance of the non-aqueous electrolytic solvent to thereby suppress gas evolution at high temperatures. In contrast, containing too much of the fluorinated phosphate ester induces an increase in the internal resistance of the battery due to the decrease in ion conductivity caused by the increased viscosity of the electrolyte solution and the decreased dielectric constant, and thus a deterioration of the charge/discharge cycling characteristics at room temperature (about 20° C.) may arise. Accordingly, the content of the fluorinated phosphate ester in the non-aqueous electrolytic solvent is preferably 10% by volume or more and 70% by volume or less, more preferably 10% by volume or more and 40% by volume or less, more preferably 10% volume or more and 30% by volume or less, still more preferably 13% by volume or more and 60% by volume or less, and even more preferably 16% by volume or more and 50% by volume or less.

Examples of the non-aqueous electrolytic solvent include, in addition to those described above, γ-lactones such as γ-butyrolactone, chain ethers such as 1,2-ethoxyethane (DEE) and ethoxymethoxyethane (EME), cyclic ethers such as tetrahydrofuran and 2-methyltetrahydrofuran, aprotic organic solvents such as dimethylsulfoxide, 1,3-dioxolane, formamide, acetamide, dimethylformamide, dioxolane, acetonitrile, propylnitrile, nitromethane, ethyl monoglyme, phosphate triester, trimethoxymethane, dioxolane derivatives, 1,3-dimethyl-2-imidazolidinone, 3-methyl-2-oxazolidinone, propylene carbonate derivatives, tetrahydrofuran derivatives, ethyl ether, anisole, and N-methylpyrrolidone. These may be used singly or two or more of them may be used in mixture.

The electrolyte solution preferably contains lithium salt. Examples of the lithium salt include, but are not particularly limited to, LiPF$_6$, LiAsF$_6$, LiAlCl$_4$, LiClO$_4$, LiBF$_4$, LiSbF$_6$, LiCF$_3$SO$_3$, LiC$_4$F$_9$CO$_3$, LiC(CF$_3$SO$_2$)$_3$, LiN(CF$_3$SO$_2$)$_2$, LiN(C$_2$F$_5$SO$_2$)$_2$, LiB$_{10}$Cl$_{10}$, lithium lower aliphatic carboxylate, chloroborane lithium, lithium tetraphenylborate, LiCl, LiBr, LiI, LiSCN, and LiCl. The concentration of the lithium salt in the electrolyte solution is preferably from 0.5 to 1.5 mol/l. A concentration of the lithium salt in such ranges makes it easy to adjust the density, viscosity, electrical conductivity and the like within an appropriate range.

[Positive Electrode]

The secondary battery of the present embodiment includes a positive electrode having a positive electrode active material which operates at a potential of 4.5 V or more versus lithium metal.

The positive electrode active material which operates at a potential of 4.5 V or more versus lithium can be selected in accordance with the following method, for example. First, a positive electrode containing the positive electrode active material and Li metal are placed so as to be faced with each other with a separator sandwiched therebetween in a battery, and an electrolyte solution is injected to produce a battery. Then, when charging/discharging is carried out at a constant current of, for example, 5 mAh/g per mass of the positive electrode active material in the positive electrode, a material having a charge/discharge capacity of 10 mAh/g or more per mass of the active material at a potential of 4.5 V or more versus lithium can be considered to be a positive electrode active material which operates at a potential of 4.5 V or more versus lithium. Additionally, when charging/discharging is carried out at a constant current of 5 mAh/g per mass of the positive electrode active material in the positive electrode, a charge/discharge capacity per mass of the active material at a potential of 4.5 V or more versus lithium is preferably 20 mAh/g or more, more preferably 50 mAh/g or more, and still more preferably 100 mAh/g or more. The shape of the battery may be, for example, a coin shape.

Examples of the positive electrode active material which operates at a potential of 4.5 V or more include positive electrode active materials having spinel-type, olivine-type, Si composite oxide, and layer structures.

In the present embodiment, for example, a spinel-type lithium-manganese composite oxide represented by the following Formula (4) can be used:

$$Li_a(M_xMn_{2-x-y}Y_y)(O_{4-w}Z_w) \quad (4)$$

(in Formula (4), 0.4≤x≤1.2, 0≤y, x+y<2, 0≤a≤1.2, 0≤w≤1. M is at least one selected from the group consisting of Co, Ni, Fe, Cr, and Cu. Y is at least one selected from the group consisting of Li, B, Na, Mg, Al, Ti, Si, K, and Ca. Z is at least one of F and Cl.)

It should be noted that, in Formula (4), when a is 0, preferably, Y includes at least Li and 0<y. When y is 0, 0<a is preferable.

The positive electrode active material which operates at a potential of 4.5 V or more is preferably a spinel-type lithium manganese composite oxide represented by the following Formula (4-1) from the viewpoint of obtaining sufficient capacity and extending the life time:

$$LiNi_xMn_{2-x-y}A_yO_4 \quad (4-1)$$

(in Formula (4-1), 0.4<x<0.6, 0≤y<0.3, and A is at least one selected from Li, B, Na, Mg, Al, Ti, and Si.)

In Formula (4-1), it is preferred that 0≤y<0.2 or 0<y<0.3. Alternatively, in Formula (4-1), A is preferably at least one selected from Li, Ti, and Si.

Examples of the spinel-type positive electrode active material which operates at a potential of 4.5 V or more include LiNi$_{0.5}$Mn$_{1.5}$O$_4$, LiCr$_x$Mn$_{2-x}$O$_4$ (0.4≤x≤1.1), LiFe$_x$Mn$_{2-x}$O$_4$ (0.4≤x≤1.1), LiCu$_x$Mn$_{2-x}$O$_4$ (0.3≤x≤0.6), LiCo$_x$Mn$_{2-x}$O$_4$ (0.4≤x≤1.1), LiCrMnO$_4$, LiFeMnO$_4$, LiCoMnO$_4$, or LiCu$_{0.5}$Mn$_{1.5}$O$_4$ and solid solutions thereof. These positive electrode active materials have high capacity.

An example of the olivine-type positive electrode active material which operates at a potential of 4.5 V or more includes:

$$LiMPO_4 \quad (5)$$

(in Formula (5), M is at least one of Co and Ni.), and is preferably LiCoPO$_4$ or LiNiPO$_4$.

An example of the positive electrode active material which operates at a potential of 4.5 V or more also includes Si composite oxides, and examples of the Si composite oxide include Li$_2$MSiO$_4$ (at least one of M:Mn, Fe, and Co).

An example of the positive electrode active material which operates at a potential of 4.5 V or more also includes one having a layer structure, such as:

$$Li(Li_xM_{1-x-z}Mn_z)O_2 \quad (6)$$

(in Formula (6), 0≤x<0.3 and 0.3≤z≤0.7, and M is at least one selected from Co, Ni, and Fe.)

The positive electrode active material has a specific surface area of, for example, from 0.01 to 5 m$^2$/g, preferably from 0.05 to 4 m$^2$/g, more preferably from 0.1 to 3 m$^2$/g, and still more preferably from 0.2 to 2 m$^2$/g. A specific surface area in such ranges makes it possible to adjust the area in contact with the electrolyte solution within an appropriate range. That is, a specific surface area of 0.01 m$^2$/g or more can facilitate smooth insertion and extraction of lithium ions and further decrease the resistance. Alternatively, a specific surface area of 5 m$^2$/g or less can promote decomposition of electrolyte solution and further suppress elution of the constituent elements of the active material.

The median particle size of the positive electrode active material is preferably from 0.1 to 50 μm and more preferably from 0.2 to 40 μm. A particle size of 0.1 μm or more can further suppress elution of constituent elements such as Mn and also further suppress deterioration due to contact with the electrolyte solution. In contrast, a particle size of 50 μm or less can facilitate smooth insertion and extraction of lithium ions and further decrease the resistance. The particle size can be measured with a laser diffraction-scattering particle size distribution analyzer.

The positive electrode contains mainly a positive electrode active material which operates at a potential of 4.5 V or more versus lithium as described above, but may contain a 4-V class active material.

A positive electrode can be formed by, for example, mixing a positive electrode active material, an electric conductivity imparting agent, and a positive electrode binder to prepare a positive electrode slurry and arranging the slurry on a current collector.

Examples of the electric conductivity-imparting agent include metal material such as Al, and electrical conductive oxide powder, in addition to carbon materials such as acetylene black, carbon black, fibrous carbon, and graphite.

Examples of the positive electrode binder which can be used include, but are not particularly limited to, polyvinylidene fluoride (PVdF), vinylidene fluoride-hexafluoropropylene copolymers, vinylidene fluoride-tetrafluoroethylene copolymer, styrene-butadiene copolymerized rubber, polytetrafluoroethylene, polypropylene, polyethylene, polyimide, and polyamide-imide.

The content of the electric conductivity-imparting agent in the positive electrode slurry may be, for example, from 1 to 10% by mass. Alternatively, the content of the binder in the positive electrode slurry may be, for example, from 1 to 10% by mass. Within such ranges, it is easy to secure a sufficient proportion of the active material in the electrode and to obtain sufficient capacity per unit mass.

Examples of the positive electrode current collector preferably include, but are not particularly limited to, aluminum, nickel, copper, silver, and alloys thereof from the viewpoint of electrochemical stability. Examples of the shape include foil, plate, and mesh shapes.

[Negative Electrode]

The negative electrode active materials are not particularly limited as long as they can absorb and release lithium ions, and for example, known materials can be used. Specific examples of the negative electrode active material include carbon materials such as graphite, coke, and hard carbon, lithium alloys such as lithium-aluminum alloys, lithium-lead alloys, and lithium-tin alloys, lithium metal, Si, and metal oxides having a potential less noble than that of the positive electrode active material, such as $SnO_2$, SnO, $TiO_2$, $Nb_2O_3$, and SiO.

A negative electrode can be formed by, for example, mixing a negative electrode active material, an electric conductivity imparting agent, and an negative electrode binder to prepare a negative electrode slurry and arranging the slurry on a negative electrode current collector.

Examples of the electric conductivity imparting agent include carbon materials and electrical conductive oxide powder.

Examples of the negative electrode binder which can be used include, but are not particularly limited to, polyvinylidene fluoride, vinylidene fluoride-hexafluoropropylene copolymers, vinylidene fluoride-tetrafluoroethylene copolymer, styrene-butadiene copolymerized rubber, polytetrafluoroethylene, polypropylene, polyethylene, polyimide, polyamide-imide, and polyacrylic acid. Among these, polyimide or polyamide imide is preferred because binding properties thereof is strong. The amount of the negative electrode binder used is preferably from 5 to 25 parts by mass based on 100 parts by mass of the negative electrode active material from the viewpoint of a trade-off relationship between "a sufficient binding power" and "an increase in energy".

Examples of the negative electrode current collector preferably include aluminum, nickel, stainless, chromium, copper, silver, and alloys thereof from the viewpoint of electrochemical stability. Examples of the shape include foil, plate, and mesh shapes.

Examples of the method for forming a negative electrode active material layer include doctor blade methods, die coater methods, CVD methods, and sputtering methods. After a negative electrode active material layer is formed in advance, a thin film of aluminum, nickel, or alloys thereof may be formed by a method such as vapor deposition and sputtering to provide a negative electrode.

[Separator]

The separator is not particularly limited, and known materials can be used, for example. Examples of the separator that can be used specifically include polyolefin microporous films such as polyethylene and polypropylene, and those containing cellulose and glass fiber.

[Outer Package]

The outer package may be appropriately selected as long as it is stable to the electrolyte solution and has sufficient water vapor barrier properties. For example, in the case of a layer laminate secondary battery, examples of the outer package that can be used include laminate films, such as polypropylene and polyethylene on which aluminum or silica is coated. Particularly, from the viewpoint of suppressing volume expansion, aluminum laminate films are preferably used.

[Secondary Battery]

The secondary battery can have a configuration in which a positive electrode having a positive electrode active material, a negative electrode having a negative electrode active material, a separator sandwiched between the positive electrode and the negative electrode as an insulator, and an electrolyte solution having lithium-ion conductivity are sealed in an outer package. Application of an electric voltage across the positive electrode and negative electrode allows the positive electrode active material to release lithium ions and the negative electrode active material to absorb the lithium ions, and thus, the battery will be in a charged state. A discharged state is a state opposite to the charged state.

Examples of the shape of the battery include cylindrical, rectangular, coin, button, and laminate shapes. Examples of the battery outer package include stainless, iron, aluminum, titanium, or alloys thereof, or plated products thereof. Examples of the plating that may be used include nickel plating.

The secondary battery can be produced as follows, for example, under a dried air or inert gas atmosphere, a laminate of a negative electrode and a positive electrode with a separator sandwiched therebetween, or the wound laminate is placed in an outer package such as a can case, an electrolyte solution is injected into the outer package, and then the outer package is sealed with a flexible film made of a laminate of synthetic resin and metal foils, for example.

The configuration of the secondary battery is not particularly limited, for example, the battery can take a configuration of a winding type in which a positive electrode and a negative electrode with a separator sandwiched therebetween so as to be faced with each other are wound, or a lamination type in which the positive electrode, the negative electrode and the separator are laminated.

Figure 1:
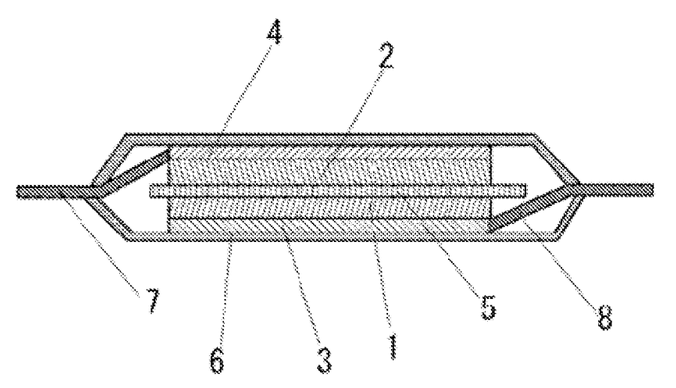
FIG. 1 is a cross sectional view of a non-aqueous electrolyte secondary battery according to one embodiment of the present invention.

FIG. 1 shows a laminate-type secondary battery as an example of the secondary battery. A separator 5 is sandwiched between a positive electrode which is formed of a positive electrode active material layer 1 containing a positive electrode active material and a positive electrode current collector, and a negative electrode which is formed of a negative electrode active material layer 2 and a negative electrode current collector. The positive electrode current collector 3 is connected with a positive electrode lead terminal 8, and the negative electrode current collector 4 is connected with an negative electrode lead terminal 7. An outer package laminate 6 is used for the outer package, and the inside of the secondary battery is filled with an electrolyte solution.

Examples of the laminate resin film used in laminate types include aluminum, aluminum alloy, and titanium foil. Examples of the material for the heat-welding portions of the metal laminate resin film include thermoplastic polymer materials such as polyethylene, polypropylene, and polyethylene terephthalate. Further, each metal laminate resin layer and metal foil layer is not limited to one layer, but they may be two or more layers.

EXAMPLES

Hereinbelow, examples of the present embodiment will be described in details, but the present embodiment is not intended to be limited to the following examples.

Abbreviations used in the following Examples 1 to 95 and Comparative Examples 1 to 3 will be described.
FE1: $H(CF_2)_2CH_2O(CF_2)_2H$
SL: sulfolane
EC: ethylene carbonate
DMC: dimethyl carbonate
PC: propylene carbonate
MMDS: methylene methanedisulfonate
PS: 1,3-propane sultone
DMS: dimethyl sulfone
EMS: ethyl methyl sulfone
EiPS: ethyl isopropyl sulfone
iPiBS: isopropyl isobutyl sulfone
TFMP: methyl-2,2,3,3-tetrafluoropropionate
FEC: monofluoroethylene carbonate
FP: $O=P(OCH_2CF_3)_3$

Example 1

(Production of a Positive Electrode)

First, powders of $MnO_2$, NiO, $Li_2CO_3$, and $Ti_3O_3$ were weighed so as to be the intended composition ratio, and were crushed and mixed. Subsequently, the mixed powder was calcined at 750° C. for 8 hours to produce $LiNi_{0.5}Mn_{1.37}Ti_{0.13}O_4$. This positive electrode active material was confirmed to have a nearly single-phase spinel structure. The produced positive electrode active material and a carbon black which is an electric conductivity imparting agent were mixed, and the mixture was dispersed in a solution of polyvinylidene fluoride (PVDF) which is dissolved in N-methylpyrrolidone and serves as a binder to thereby prepare a positive electrode slurry. The mass ratio of the positive electrode active material, the electric conductivity imparting agent, and the positive electrode binder was 91/5/4. The positive electrode slurry was uniformly applied on the both sides of a current collector formed of Al. Subsequently, the current collector was dried in vacuum for 12 hours and was subjected to a compression-molding by a roll press to thereby produce a positive electrode.

(Production of a Negative Electrode)

Graphite as a negative electrode active material was dispersed in a solution of polyvinylidene fluoride (PVDF) as a negative electrode binder in N-methylpyrrolidone to prepare a negative electrode slurry. The mass ratio of the negative electrode active material and the negative electrode binder was 90/10. The slurry was uniformly applied on the both sides of a Cu current collector. Subsequently, the current collector was dried in vacuum for 12 hours and was subjected to a compression-molding by a roll press to thereby produce a negative electrode.

(Electrolyte Solution)

A fluorinated ether (FE1) represented by $H(CF_2)_2CH_2O(CF_2)_2H$ and sulfolane (SL) were mixed so as to achieve FE1:SL=30:70 (volume ratio) to prepare a solvent. $LiPF_6$ is each added to this solvent so as to reach 1 M to thereby prepare an electrolyte solution.

(Production of a Laminate-Type Battery)

The positive electrode and the negative electrode were cut into 1.5 cm×3 cm. The five positive electrode layers and six negative electrode layers obtained were alternately laminated with polypropylene porous films sandwiched therebetween as a separator. The ends of the positive electrode current collector not covered with the positive electrode active material and the ends of the negative electrode current collector not covered with the negative electrode active material were each welded, and a positive electrode terminal made of aluminum and a positive electrode terminal made of nickel were welded to the welded parts to thereby obtain an electrode element having a flat laminate structure. The electrode element described above was enclosed with an aluminum laminate film that serves as an outer package, then electrolyte solution was injected into the internal of outer package, subsequently the outer package was sealed under reduced pressure to thereby produce a secondary battery.

Examples 2 to 11 and Comparative Examples 1 to 3

Batteries were produced as in Example 1 except that the composition of the solvent and additives in the electrolyte solution was set as described in Table 1. As shown in Table 1, in Examples 4 to 11, one or more selected from MMDS (methylene methanedisulfonate ester), PS (1,3-propanesultone), LiFSI, TFMP (methyl-2,2,3,3-tetrafluoropropionate), FEC (monofluoroethylene carbonate), PC (propylene carbonate), and EC (ethylene carbonate) were mixed in addition to SL and FE1. In examples in which two or more of the carbonate ester compounds and/or fluorinated carboxylate esters in Table 1 were mixed, the figures in the parentheses represent the volume ratio of these. Alternatively, in examples in which an additive is used, the figures in the parentheses represent the content of the additive (% by mass) in the electrolyte solution.

(High Temperature Cycle Test)

High temperature cycling characteristics were evaluated on the batteries produced as described above. A cycle including charging a battery at 1 C to 4.8 V and carrying out constant voltage charge for a total of 2.5 hours and then carrying out constant current discharge at 1 C to 3.0 V was repeated 300 times at 45° C. The proportion of the discharge capacity after 300 cycles to the initial discharge capacity was determined as the capacity retention.

(Evaluation of Gas Evolution)

The amount of gas evolved was evaluated by measuring the change in the battery volume after the charge/discharge cycles. The cell volume was measured using the Archimedean method, and the difference before and after the charge/discharge cycles was examined to thereby calculate the amount of gas evolved.

Table 1 shows the capacity retention ratio and volume increase ratio after 300 cycles at 45° C. of Examples 1 to 11 and Comparative Examples 1 to 3 in which the solvent composition and additive composition were varied. As shown in Comparative Examples 1 to 3, the electrolyte solution containing only one of the sulfone compound and fluorinated ether or the electrolyte solution containing neither of them had poor capacity retention and a large amount of increase in the volume, in the case of a positive electrode which operates at a potential of 4.5 V or more. However, as shown in Examples 1 to 11, when the electrolyte solution containing both of the fluorinated ether compound and sulfone compound was used, it was found that the capacity retention was improved in the cycles at a high temperature of 45° C. and the increase in the volume due to gas evolution was suppressed.

In addition, although the gas evolution was considerably suppressed by use of a mixed solvent containing only the fluorinated ether compound and sulfone compound, it was shown that further inclusion of at least one of the third compounds which have a film-forming effect (a carbonate ester compound, a fluorinated carboxylate ester, a cyclic sulfonate ester, and compounds containing an $N(SO_2F)_2$ anion (FSI anion)) has achieved both effects of enhancing the capacity retention and suppressing gas evolution to thereby provide batteries having more satisfactory characteristics.

Examples 12 to 40

Batteries were produced as in Example 1 except that an electrolyte solution containing a solvent having a composition ratio of the fluorinated ether/sulfone compound/carbonate ester compound shown in Table 2 was used. An electrolyte solution further containing additives shown in Table 2 was used in Examples 31 to 40. The results of evaluation carried out as in Example 1 are shown in Table 2. As with Examples 12 to 40, even if the composition ratio and types of the fluorinated ether/sulfone compound/carbonate ester compound were changed, satisfactory cycling characteristics were provided. Further addition of the additives made the cycling characteristics satisfactory. It should be noted that, in examples in which two or more carbonate ester compounds are used in Table 2, the figures in the parentheses represent the volume ratio of these. Alternatively, in examples in which the additives are used, the figures in the parentheses represent the content of the additive (% by mass) in the electrolyte solution.

TABLE 1

| | Non-aqueous electrolytic solvent | | | | Additive | 45° C. 300 cycles | |
|---|---|---|---|---|---|---|---|
| | Fluorinated | | Carbonate ester compound and/or fluorinated carboxylate | | Additive | | |
| | ether compound (A) | Sulfone compound (B) | ester (C) | Composition ratio (volume ratio) | (amount added (wt %)) | Capacity retention (%) | Volume increase (%) |
| Comp-Ex. 1 | — | — | EC/DMC(4/6) | 0/0/100 | — | 45 | 67.2 |
| Comp-Ex. 2 | — | SL | EC/DMC(4/6) | 0/50/50 | — | 44.7 | 26 |
| Comp-Ex. 3 | FE1 | — | EC/DMC(2/1) | 40/0/60 | — | 43.1 | 33.4 |
| Ex. 1 | FE1 | SL | — | 30/70/0 | — | 45.3 | 1.7 |
| Ex. 2 | FE1 | SL | — | 50/50/0 | — | 46.5 | 1.0 |
| Ex. 3 | FE1 | SL | — | 70/30/0 | — | 46.1 | 0.7 |
| Ex. 4 | FE1 | SL | — | 70/30/0 | MMDS(0.5) | 53.6 | 0.8 |
| Ex. 5 | FE1 | SL | — | 70/30/0 | PS(0.5) | 52.9 | 0.7 |
| Ex. 6 | FE1 | SL | — | 70/30/0 | LiFSI(0.5) | 53.3 | 0.8 |
| Ex. 7 | FE1 | SL | TFMP | 40/40/20 | — | 52.3 | 0.9 |
| Ex. 8 | FE1 | SL | TFMP | 40/30/30 | — | 54.5 | 1.2 |
| Ex. 9 | FE1 | SL | FEC | 70/25/5 | — | 52.2 | 1.9 |
| Ex. 10 | FE1 | SL | PC | 60/20/20 | — | 63.8 | 2.5 |
| Ex. 11 | FE1 | SL | EC | 60/20/20 | — | 69.8 | 4.7 |

The "composition ratio" in the table is based on the volume.
Ex. = Example
Comp-Ex. = Comparative Example

TABLE 2

| | Non-aqueous electrolytic solvent | | | | Additive | 45° C. 300 cycles | |
|---|---|---|---|---|---|---|---|
| | Fluorinated ether compound (A) | Sulfone compound (B) | Carbonate ester compound (C) (volume ratio) | Composition ratio (A:B:C) | Additive (additive amount (wt %)) | Capacity retention ratio (%) | Volume increase (%) |
| Ex. 12 | FE1 | SL | EC | 20/40/40 | — | 47 | 6.1 |
| Ex. 13 | FE1 | SL | EC | 40/30/30 | — | 62 | 4.6 |
| Ex. 14 | FE1 | SL | EC | 50/10/40 | — | 58.9 | 6.7 |
| Ex. 15 | FE1 | SL | EC | 50/20/30 | — | 59.7 | 5 |
| Ex. 16 | FE1 | SL | EC | 50/30/20 | — | 61.6 | 2 |
| Ex. 17 | FE1 | SL | EC | 50/40/10 | — | 57.3 | 1.3 |
| Ex. 18 | FE1 | SL | EC | 60/20/20 | — | 69.8 | 4.7 |
| Ex. 19 | FE1 | SL | EC | 60/30/10 | — | 64.9 | 3.2 |
| Ex. 20 | FE1 | SL | EC | 70/20/10 | — | 67.7 | 3.1 |
| Ex. 21 | FE1 | SL | EC | 80/10/10 | — | 71 | 4 |
| Ex. 22 | FE1 | SL | FEC | 60/30/10 | — | 59.3 | 3.3 |
| Ex. 23 | FE1 | SL | FEC | 60/35/5 | — | 55 | 2.2 |
| Ex. 24 | FE1 | SL | EC/PC(1/1) | 60/30/10 | — | 68.6 | 2.1 |
| Ex. 25 | FE1 | SL | EC/PC(2/1) | 60/25/10 | — | 67.9 | 2.4 |
| Ex. 26 | FE1 | SL | EC/PC(2/1) | 60/20/20 | — | 63.6 | 7.4 |
| Ex. 27 | FE1 | SL | PC/FEC(5/1) | 58/30/12 | — | 64.7 | 2.4 |
| Ex. 28 | FE1 | SL | EC/FEC(5/1) | 58/30/12 | — | 66.3 | 2.8 |
| Ex. 29 | FE1 | SL | EC/DMC(3/1) | 60/20/20 | — | 66.5 | 8.8 |
| Ex. 30 | FE1 | SL | EC/DMC(2/1) | 60/20/20 | — | 66.5 | 8.8 |
| Ex. 31 | FE1 | SL | EC | 60/20/20 | MMDS(1) | 70.3 | 5.9 |
| Ex. 32 | FE1 | SL | EC/DMC(2/1) | 60/20/20 | MMDS(1) | 68.4 | 9.3 |
| Ex. 33 | FE1 | SL | EC | 60/20/20 | PS(3) | 69.9 | 5.1 |
| Ex. 34 | FE1 | SL | EC/DMC(2/1) | 60/20/20 | PS(3) | 67.8 | 7.8 |
| Ex. 35 | FE1 | SL | EC | 50/30/20 | MMDS(0.5) | 64.3 | 2.3 |
| Ex. 36 | FE1 | SL | EC | 50/30/20 | PS(0.5) | 63.9 | 1.8 |
| Ex. 37 | FE1 | SL | EC | 50/30/20 | LiFSI(0.5) | 62.2 | 1.9 |
| Ex. 38 | FE1 | SL | EC | 50/30/20 | MMDS(0.5) PS(0.5) | 65.8 | 2.1 |
| Ex. 39 | FE1 | SL | EC | 50/30/20 | PS(0.5) LiFSI(0.5) | 66.7 | 1.8 |
| Ex. 40 | FE1 | SL | EC | 50/30/20 | MMDS(0.5) LiFSI(0.5) | 66.8 | 1.6 |

The composition ratio in the table is based on the volume.
Ex. = Example

Examples 41 to 52

Batteries were produced as in Example 1 except that an electrolytic solvent further containing a fluorinated phosphate ester or fluorinated carboxylate ester in addition to the fluorinated ether/sulfone compound/carbonate ester compound and an electrolyte solution mixed with various additives as shown in Table 3 were used. The results of evaluation carried out as in Example 1 are shown in Table 3. Satisfactory cycling characteristics and greatly suppressed gas evolution were achieved by comprising fluorinated phosphate ester or fluorinated carboxylate ester in the electrolyte solution as in Examples 41 to 52. Additionally, inclusion of the various additives in the electrolyte solution achieved these effects. The figures in the parentheses represent the volume ratio of these in the non-aqueous electrolytic solvent. In examples in which an additive is used, the figures in the parentheses represent the content of the additive (% by mass) in the electrolyte solution.

TABLE 3

| | Non-aqueous electrolytic solvent | | | | | Additive | 45° C. 300 cycles | |
|---|---|---|---|---|---|---|---|---|
| | Fluorinated ether compound (A) | Sulfone compound (B) | Carbonate ester compound (C) | Fluorinated phosphate ester compound or fluorinated carboxylate ester (D) | Composition ratio (A:B:C:D) | Additive (additive amount (wt %)) | Capacity retention ratio (%) | Volume increase (%) |
| Ex. 41 | FE1 | SL | EC | FP | 40/20/10/30 | — | 68.1 | 1.0 |
| Ex. 42 | FE1 | SL | EC | FP | 50/20/10/20 | — | 67.1 | 0.9 |
| Ex. 43 | FE1 | SL | PC | FP | 50/20/10/20 | — | 66.5 | 0.9 |
| Ex. 44 | FE1 | SL | EC/PC (1/1) | FP | 50/20/10/20 | — | 67.9 | 0.8 |

TABLE 3-continued

| | Non-aqueous electrolytic solvent | | | | | Additive | 45° C. 300 cycles | |
|---|---|---|---|---|---|---|---|---|
| | Fluorinated ether compound (A) | Sulfone compound (B) | Carbonate ester compound (C) | Fluorinated phosphate ester compound or fluorinated carboxylate ester (D) | Composition ratio (A:B:C:D) | Additive (additive amount (wt %)) | Capacity retention ratio (%) | Volume increase (%) |
| Ex. 45 | FE1 | SL | EC | FP | 50/20/10/20 | MMDS(0.5) | 69 | 1.2 |
| Ex. 46 | FE1 | SL | EC | FP | 50/20/10/20 | PS(0.5) | 68.8 | 0.8 |
| Ex. 47 | FE1 | SL | EC | FP | 50/20/10/20 | LiFSI(0.5) | 69 | 1.0 |
| Ex. 48 | FE1 | SL | EC | FP | 50/20/10/20 | MMDS(0.5) PS(0.5) | 70.5 | 0.9 |
| Ex. 49 | FE1 | SL | EC | FP | 50/20/10/20 | MMDS(0.5) LiFSI(0.5) | 70.2 | 0.7 |
| Ex. 50 | FE1 | SL | EC/FEC (8/2) | FP | 50/20/10/20 | MMDS(0.5) | 69.8 | 0.8 |
| Ex. 51 | FE1 | SL | PC | TFMP | 40/10/20/30 | — | 59.7 | 1.7 |
| Ex. 52 | FE1 | SL | EC/PC (1/2) | TFMP | 40/10/20/30 | — | 58.1 | 2.3 |

The composition ratio in the table is based on the volume.
Ex. = Example

Examples 53 to 72

Batteries were produced as in Example 11 except that a fluorinated ether of the structural formula shown in Table 4 was used and that the composition of the electrolyte solution was set as shown in Table 4. The results of the evaluation carried out as in Example 1 are shown in Table 4. As shown in Example 11 and Examples 53 to 72, when the types of the fluorinated ether were changed, satisfactory cycling characteristics were also achieved.

Examples 73 to 81

Batteries were produced as in Example 1 except that a sulfone compound shown in Table 5 was used and that the electrolyte solution composition was set as shown in Table 5. The sulfone compounds used in each Example are sulfolane (SL), dimethylsulfone (DMS), ethylmethylsulfone (EMS), ethylisopropylsulfone (EiPS), and isopropylisobutylsulfone (iPiBS). The results of evaluation of the secondary batteries produced as in Example 1 are shown. As shown in Table 5, when the types of the sulfone compounds or

TABLE 4

| | Non-aqueous electrolytic solvent | | | | 45° C. cycles |
|---|---|---|---|---|---|
| | Fluorinated ether compound (A) | Sulfone compound (B) | Carbonate ester compound (C) | Composition ratio (A:B:C) | Capacity retention ratio (%) |
| Ex. 11 | $H(CF_2)_2CH_2O(CF_2)_2H$ | SL | EC | 60/20/20 | 69.8 |
| Ex. 53 | $CH_3CH_2O(CF_2)_4F$ | SL | EC | 60/20/20 | 67.5 |
| Ex. 54 | $F(CF_2)_4CH_2O(CF_2)_2H$ | SL | EC | 60/20/20 | 66.8 |
| Ex. 55 | $CF_3CHFCF_2OCH_2(CF_2)_2F$ | SL | EC | 60/20/20 | 68.8 |
| Ex. 56 | $H(CHF)_2CH_2O(CF_2)_2H$ | SL | EC | 60/20/20 | 65.3 |
| Ex. 57 | $(CF_3)(CF_2)CH_2O(CF_2)_2H$ | SL | EC | 60/20/20 | 65.7 |
| Ex. 58 | $H(CF_2)_2CH_2O(CF_2)_3H$ | SL | EC | 60/20/20 | 66.2 |
| Ex. 59 | $H(CF_2)_3CH_2O(CF_2)_2H$ | SL | EC | 60/20/20 | 67.0 |
| Ex. 60 | $CF_3(CF_2)CH_2O(CF_2)CF_3$ | SL | EC | 60/20/20 | 65.7 |
| Ex. 61 | $F(CF_2)_4OC_2H_5$ | SL | EC | 60/20/20 | 65.4 |
| Ex. 62 | $H(CF_2)_2CH_2OCF_2CHFCF_3$ | SL | EC | 60/20/20 | 64.2 |
| Ex. 63 | $F(CF_2)_2CH_2OCF_2CHFCF_3$ | SL | EC | 60/20/20 | 62.7 |
| Ex. 64 | $H(CF_2)_4CH_2O(CF_2)H$ | SL | EC | 60/20/20 | 61.8 |
| Ex. 65 | $CF_3CHFCF_2OCH_2(CF_2)_3F$ | SL | EC | 60/20/20 | 66.1 |
| Ex. 66 | $CH_3CF_2OCH_2(CF_2)_2F$ | SL | EC | 60/20/20 | 65.0 |
| Ex. 67 | $CH_3CF_2OCH_2(CF_2)_3F$ | SL | EC | 60/20/20 | 63.8 |
| Ex. 68 | $CH_3O(CF_2)_5F$ | SL | EC | 60/20/20 | 61.5 |
| Ex. 69 | $F(CF_2)_3CH_2OCH_2(CF_2)_3F$ | SL | EC | 60/20/20 | 63.3 |
| Ex. 70 | $F(CF_2)_2CH_2OCH_2(CF_2)_2F$ | SL | EC | 60/20/20 | 64.9 |
| Ex. 71 | $H(CF_2)_2CH_2OCH_2(CF_2)_2H$ | SL | EC | 60/20/20 | 66.0 |
| Ex. 72 | $CH_3CF_2OCH_2(CF_2)_2H$ | SL | EC | 60/20/20 | 63.6 |

* The "composition ratio" is based on the volume.
Ex. = Example combination of two sulfone compounds were changed, satisfactory cycling characteristics were also achieved.

TABLE 5

| | Non-aqueous electrolytic solvent | | | | 45° C. cycles |
|---|---|---|---|---|---|
| | Fluorinated ether compound (A) | Sulfone compound (B) | (C) | Carbonate ester compound (D) | Composition ratio (volume ratio) (A:B:C:D) | Capacity retention ratio (%) |
| Ex. 11 | FE1 | SL | | EC | 60/20/0/20 | 69.8 |
| Ex. 73 | FE1 | DMS | | EC | 60/20/0/20 | 69.5 |
| Ex. 74 | FE1 | DMS | | EC | 50/30/0/20 | 67.8 |
| Ex. 75 | FE1 | EMS | | EC | 60/20/0/20 | 70.2 |
| Ex. 76 | FE1 | EiPS | | EC | 60/20/0/20 | 68.7 |
| Ex. 77 | FE1 | iPiBS | | EC | 60/20/0/20 | 62.2 |
| Ex. 78 | FE1 | SL | EMS | EC | 60/10/10/20 | 70.1 |
| Ex. 79 | FE1 | SL | EMS | EC | 40/20/20/20 | 69.2 |
| Ex. 80 | FE1 | SL | DMS | EC | 60/10/10/20 | 72.3 |

* The "composition ratio" is based on the volume.
DMS: dimethylsulfone
EMS: ethylmethylsulfone
EiPS: ethylisopropylsulfone
iPiBS: isopropylisobutylsulfone
Ex.: Example Examples 82 to 95

Batteries were produced as in Example 11 except that positive electrode active materials shown in Table 6 were used. Here, $SiO_2$ powder as the raw material of Si, MgO powder as the raw material of Mg, $Na_2O$ powder as the raw material of Na, $B_2O_3$ powder as the raw material of B, $Al_2O_3$ powder as the raw material of Al, LiF powder as the raw material of F, $Fe_2O_3$ powder as the raw material of Fe, $Cr_2O_3$ powder as the raw material of Cr, and $Co_2O_3$ powder as the raw material of Co were used. The results of the evaluation of the secondary batteries produced as in Example 11 are shown. As shown in Table 4, when the types of the positive electrode active material which operates at a potential of 4.5 V or more versus lithium were changed, satisfactory cycling characteristics were also achieved.

Additionally, specific examples of the present embodiment are shown below.

In the following Examples 101 to 113, abbreviations of the compounds used are as follows.
EC: ethylene carbonate
DMC: dimethyl carbonate
FE1: $H(CF_2)_2CH_2OCF_2CF_2H$
FE2: $CH_3CH_2O(CF_2)_4F$
FP: $O=P(OCH_2CF_3)_3$
SL: sulfolane represented by $C_4H_8SO_2$
DMS: dimethyl sulfone
EMS: ethyl methyl sulfone
EiPS: ethyl isopropyl sulfone Example 101

(Production of a Negative Electrode)
Natural graphite powder (average particle size (DO: 20 μm, specific surface area: 1 m$^2$/g) as the negative electrode active material and PVDF as the binder were uniformly dispersed in NMP at a mass ratio of 95:5 to prepare a negative electrode slurry. This negative electrode slurry was applied on the both sides of copper foil having a thickness of 15 μm, which was an anode current collector and dried at 125° C. for 10 minutes to evaporate NMP and form a negative electrode active material layer. The layer was then pressed to produce a negative electrode. The weight of the negative electrode active material layer per unit area after drying was 0.015 g/cm$^2$.

(Production of a Positive Electrode)
$LiNi_{0.5}Mn_{1.5}O_4$ powder (average particle size ($D_{50}$): 10 μm, specific surface area: 0.5 m$^2$/g) as the positive electrode active material was provided. A positive electrode active material, PVDF as the binder, and carbon black as the conductive assistant were uniformly dispersed in NMP at a mass ratio of 93:4:3 to produce a positive electrode slurry. This positive electrode slurry was applied on the both sides of aluminum foil having a thickness of 20 μm, which was a positive electrode current collector, and dried at 125° C. for 10 minutes to evaporate NMP and produce a positive electrode. The weight of the positive electrode active material layer per unit area after drying was 0.040 g/cm$^2$.

TABLE 6

| | | Non-aqueous electrolytic solvent | | | | 45° C. cycles |
|---|---|---|---|---|---|---|
| | Positive electrode active material | Fluorinated ether compound (A) | Sulfone compound (B) | Carbonate ester compound (C) | Composition ratio (A:B:C) | Capacity retention ratio (%) |
| Ex. 11 | $LiNi_{0.5}Mn_{1.37}Ti_{0.13}O_4$ | FE1 | SL | EC | 60/20/20 | 69.8 |
| Ex. 82 | $LiNi_{0.5}Mn_{1.48}Ti_{0.02}O_4$ | FE1 | SL | EC | 60/20/20 | 69.6 |
| Ex. 83 | $LiNi_{0.5}Mn_{1.45}Si_{0.05}O_4$ | FE1 | SL | EC | 60/20/20 | 68.1 |
| Ex. 84 | $LiNi_{0.5}Mn_{1.45}Mg_{0.05}O_4$ | FE1 | SL | EC | 60/20/20 | 68.8 |
| Ex. 85 | $LiNi_{0.5}Mn_{1.45}Na_{0.05}O_4$ | FE1 | SL | EC | 60/20/20 | 68.3 |
| Ex. 86 | $LiNi_{0.5}Mn_{1.45}Li_{0.05}O_4$ | FE1 | SL | EC | 60/20/20 | 69.1 |
| Ex. 87 | $LiNi_{0.5}Mn_{1.45}B_{0.05}O_4$ | FE1 | SL | EC | 60/20/20 | 67.8 |
| Ex. 88 | $LiNi_{0.5}Mn_{1.45}Al_{0.05}O_{3.95}F_{0.05}$ | FE1 | SL | EC | 60/20/20 | 68.9 |
| Ex. 89 | $LiNi_{0.5}Mn_{1.5}O_4$ | FE1 | SL | EC | 60/20/20 | 62.3 |
| Ex. 90 | $LiNi_{0.25}Fe_{0.25}Mn_{1.5}O_4$ | FE1 | SL | EC | 60/20/20 | 56.7 |
| Ex. 91 | $LiNi_{0.25}Cr_{0.25}Mn_{1.5}O_4$ | FE1 | SL | EC | 60/20/20 | 55.9 |
| Ex. 92 | $LiFe_{0.5}Mn_{1.5}O_4$ | FE1 | SL | EC | 60/20/20 | 51.4 |
| Ex. 93 | $LiFe_{0.5}Mn_{1.45}Na_{0.05}O_{3.95}F_{0.15}$ | FE1 | SL | EC | 60/20/20 | 53.8 |
| Ex. 94 | $LiCoPO_4$ | FE1 | SL | EC | 60/20/20 | 51.7 |
| Ex. 95 | $Li(Li_{0.15}Ni_{0.2}Mn_{0.65})O_2$ | FE1 | SL | EC | 60/20/20 | 50.1 |

* The "composition ratio" is based on the volume.
Ex. = Example (Non-Aqueous Electrolyte Solution)

EC, PC, FE1, FP, and a cyclic sulfone compound represented by $C_4H_8SO_2$ (sulfolane, SL) were mixed at a proportion of EC:PC:SL:FE1:FP=10:10:10:40:30 (volume ratio) to prepare a non-aqueous solvent. $LiPF_6$ as the electrolyte was dissolved at a concentration of 0.8 mol/L. In this electrolytic solution, 1% by mass of LiFSI as an additive was dissolved based on the total mass of the non-aqueous electrolyte solution to prepare a non-aqueous electrolyte solution.

(Production of a Laminate-Type Battery)

The positive electrode and the negative electrode were cut into 1.5 cm×3 cm. The five positive electrode layers and six negative electrode layers obtained were alternately laminated with polypropylene porous films as a separator sandwiched therebetween. The ends of the positive electrode current collector not covered with the positive electrode active material and the ends of the negative electrode current collector not covered with the negative electrode active material were each welded. Additionally to each welded part, a positive electrode terminal made of aluminum and a positive electrode terminal made of nickel were welded to thereby obtain an electrode element having a flat laminate structure. The electrode element described above was enclosed with an aluminum laminate film as an outer package. After the electrolyte solution was injected into the inside, sealing is carried out under reduced pressure to thereby produce a secondary battery.

(Initial Charge/Discharge)

The laminate-type battery produced as described above was charged at a constant current of 16 mA, which corresponds to 5 hour rate (0.2 C), at 20° C. to 4.75 V. Subsequently, the battery was subjected to a constant voltage charge at 4.75 V for 8 hours in total, followed by a constant current discharge at 80 mA, which corresponds to 1 hour rate (1 C), to 3.0 V.

(Cycle Test)

The laminate-type battery after the initial charge/discharge was charged at 1 C to 4.75 V. Subsequently, the battery was subjected to a charge/discharge cycle of a constant voltage charge at 4.75 V for 2.5 hours in total followed by a constant current discharge at 1 C to 3.0 V. The cycle was repeated 300 times at 45° C. The proportion of the discharge capacity after 300 cycles to the initial discharge capacity was calculated as the capacity retention ratio (%). Additionally, the battery volumes after the initial charge/discharge and after 300 cycles were determined to thereby calculate the volume increase ratio (%) of the battery after 300 cycles based on the battery volume after the initial charge/discharge. The volume was measured from the difference between the weight in water and the weight in air using the Archimedean method.

Example 102

A secondary battery was produced by the method as in Example 101 except that LiFSI was not added, and then it was subjected to evaluation.

Example 103

A secondary battery was produced by the method as in Example 101 except that, instead of LiFSI in Example 101, 1% by mass of methylene methane disulfonate ester (MMDS) as an additive was added in the total mass of the non-aqueous electrolyte solution, and then it was subjected to evaluation.

Example 104

A secondary battery was produced by the method as in Example 101 except that, instead of the additive in Example 101, 0.5% by mass of LiFSI in the total mass of the non-aqueous electrolyte solution and 0.5% by mass of MMDS in the total mass of the non-aqueous electrolyte solution were added as additives, and then it was subjected to evaluation.

Example 105

A secondary battery was produced by the method as in Example 104 except that, instead of the non-aqueous solvent in Example 104, a non-aqueous solvent in which EC, FE1, FP, and SL were mixed at a volume proportion of EC:SL:FE1:FP=10:20:40:30 was used, and then it was subjected to evaluation.

The results of Examples 101 to 105 are shown in Table 7.

TABLE 7

| | Non-aqueous solvent (volume ratio) | Additive | Capacity retention ratio (%) | Amount of increase in the volume (%) |
|---|---|---|---|---|
| Ex. 102 | EC/PC/SL/FE1/FP = 1/1/1/4/3 | — | 56 | 40 |
| Ex. 103 | EC/PC/SL/FE1/FP = 1/1/1/4/3 | MMDS | 63 | 31 |
| Ex. 101 | EC/PC/SL/FE1/FP = 1/1/1/4/3 | LiFSI | 65 | 16 |
| Ex. 104 | EC/PC/SL/FE1/FP = 1/1/1/4/3 | MMDS + LiFSI | 68 | 12 |
| Ex. 105 | EC/SL/FE1/FP = 1/2/4/3 | MMDS + LiFSI | 69 | 10 |

Ex. = Example

Example 106

A secondary battery was produced by the method as in Example 104 except that $CH_3CH_2O(CF_2)_4F$ (FE2) as the fluorinated ether instead of FE1 was used, and then it was subjected to evaluation.

Example 107

A secondary battery was produced by the method as in Example 104 except that $H(CF_2)_4CH_2O(CF_2)_2H$ as the fluorinated ether instead of FE1 was used, and then it was subjected to evaluation.

Example 108

A secondary battery was produced by the method as in Example 104 except that $CF_3CHFCF_2OCH_2(CF_2)_2F$ as the fluorinated ether instead of FE1 was used, and then it was subjected to evaluation.

Example 109

A secondary battery was produced by the method as in Example 104 except that dimethylsulfone (DMS) was used as the sulfone compound instead of SL, and then it was subjected to evaluation.

Example 110

A secondary battery was produced by the method as in Example 104 except that ethylmethylsulfone (EMS) was used as the sulfone compound instead of SL, and then it was subjected to evaluation.

Example 111

A secondary battery was produced by the method as in Example 104 except that ethylisopropylsulfone (EiPS) was used as the sulfone compound instead of SL, and then it was subjected to evaluation.

The results of Examples 106 to 111 are shown in Table 8.

TABLE 8

| | Non-aqueous solvent | | | Capacity retention | Amount of increase |
|---|---|---|---|---|---|
| | Fluorinated ether | Sulfone compound | Additive | ratio (%) | in the volume (%) |
| Ex. 106 | $CH_3CH_2O(CF_2)_4F$ | SL | MDDS + LiFSI | 67 | 12 |
| Ex. 107 | $H(CF_2)_4CH_2O(CF_2)_2H$ | SL | MDDS + LiFSI | 65 | 13 |
| Ex. 108 | $CF_3CHFCF_2OCH_2(CF_2)_2F$ | SL | MMDS + LiFSI | 66 | 12 |
| Ex. 109 | $H(CF_2)_2CH_2OCF_2CF_2H$ | DMS | MMDS + LiFSI | 69 | 13 |
| Ex. 110 | $H(CF_2)_2CH_2OCF_2CF_2H$ | EMS | MMDS + LiFSI | 68 | 14 |
| Ex. 111 | $H(CF_2)_2CH_2OCF_2CF_2H$ | EiPS | MMDS + LiFSI | 67 | 14 |

The composition of the non-aqueous solvent of Examples 106 to 111 (volume ratio) is (EC/PC/sulfone compound/fluorinated ether/FP = 1/1/1/4/3).
Ex. = Example

Example 112

A secondary battery was produced by the method as in Example 104 except that 1,3-propanesultone (PS) was used as the cyclic sulfonate ester instead of MMDS, and then it was subjected to evaluation.

Example 113

A secondary battery was produced by the method as in Example 104 except that 1,4-butanesultone (BS) was used as the cyclic sulfonate ester instead of MMDS, and then it was subjected to evaluation.

The results of Examples 112 and 113 are shown in Table 9.

TABLE 9

| | Non-aqueous solvent (volume ratio) | Additive | Capacity retention ratio (%) | Amount of increase in the volume (%) |
|---|---|---|---|---|
| Ex. 112 | EC/PC/SL/FE1/FP = 1/1/1/4/3 | PS + LiFSI | 65 | 14 |
| Ex. 113 | EC/PC/SL/FE1/FP = 1/1/1/4/3 | BS + LiFSI | 65 | 14 |

Ex. = Example

A high voltage battery having improvements in the lifetime characteristics and gas evolution can be obtained in accordance with the present embodiment as shown above.

REFERENCE SIGNS LIST

1: positive electrode active material layer
2: negative electrode active material layer
3: positive electrode current collector
4: negative electrode current collector
5: separator
6: outer package laminate
7: negative electrode lead terminal
8: positive electrode lead terminal

The invention claimed is:

1. A secondary battery comprising a positive electrode capable of absorbing and releasing lithium, and an electrolyte solution comprising a non-aqueous electrolytic solvent,
wherein the positive electrode has a positive electrode active material which operates at 4.5 V or more versus lithium, and
wherein the non-aqueous electrolytic solvent comprises a sulfone compound represented by the following Formula (1) and a fluorinated ether compound represented by the following Formula (2),
and wherein the content of the fluorinated ether compound in the non-aqueous electrolytic solvent is from 40 to 90% by volume:

(1)

(in Formula (1), $R_1$ and $R_2$ each independently represent substituted or unsubstituted alkyl group a carbon atom of $R_1$ and a carbon atom of $R_2$ may be bonded through a single bond or double bond to form a cyclic structure);

(2)

(in Formula (2), $R_1$ and $R_2$ each independently represent alkyl group or fluorinated alkyl group, and at least one of $R_1$ and $R_2$ is fluorinated alkyl group).

2. The secondary battery according to claim 1, wherein the electrolyte solution further comprises at least one selected from a fluorinated carboxylate ester represented by the following Formula (A), a cyclic sulfonate ester represented by the following Formula (9), a compound containing an N(SO₂F)₂ anion (FSI anion) represented by the following Formula (B), and a carbonate ester compound represented by the following Formula (3):

(A)

(in Formula (A), $R_1$ and $R_2$ each independently represent substituted or unsubstituted alkyl group, and at least one of $R_1$ and $R_2$ is fluorine-substituted alkyl group);

(9)

(in Formula (9), A and B each independently represent alkylene group or fluorinated alkylene group, X represents a single bond or —OSO₂— group);

(B)

(3)

(in Formula (3), $R_1$ and $R_2$ each independently represent substituted or unsubstituted alkyl group a carbon atom of $R_1$ and a carbon atom of $R_2$ may be bonded through a single bond or double bond to form a cyclic structure).

3. The secondary battery according to claim 1, wherein the non-aqueous electrolytic solvent further comprises a fluorinated phosphate ester represented by the following Formula (C):

(C)

(in Formula (C), $R^1$, $R^2$, and $R^3$ each independently represent substituted or unsubstituted alkyl group, and at least one of $R^1$, $R^2$, and $R^3$ is fluorine-substituted alkyl group a carbon atom of $R^1$ and a carbon atom of $R^2$ may be bonded through a single bond or double bond to form a cyclic structure).

4. The secondary battery according to claim 1, wherein the positive electrode active material is a lithium manganese composite oxide represented by any of the following Formulas (4), (5), and (6):

(4)

(in Formula (4), $0.4 \le x \le 1.2$, $0 \le y$, $x+y<2$, $0 \le a \le 1.2$, $0 \le w \le 1$, M includes at least one selected from the group consisting of Co, Ni, Fe, Cr, and Cu Y is at least one selected from the group consisting of Li, B, Na, Mg, Al, Ti, Si, K, and Ca, Z is at least one of F and Cl);

(5)

(in Formula (5), M is at least one of Co and Ni);

(6)

(in Formula (6), $0 \le x<0.3$ and $0.3 \le z \le 0.7$, and M is at least one selected from Co, Ni, and Fe).

5. The secondary battery according to claim 1, wherein the positive electrode active material is a lithium manganese composite oxide represented by the following Formula (4-1):

(4-1)

(in Formula (4-1), $0.4<x<0.6$, $0 \le y<0.3$, and A is at least one selected from Li, B, Na, Mg, Al, Ti, and Si).

6. The secondary battery according to claim 1, wherein the fluorinated ether compound is represented by the following Formula (8-1):

(8-1)

(in Formula (8-1), n and m are each independently 1 to 8, $X^1$ to $X^6$ each independently represent a fluorine atom or hydrogen atom, provided that at least one of $X^1$ to $X^3$ is a fluorine atom, and at least one of $X^4$ to $X^6$ is a fluorine atom, when n is 2 or more, $X^2$ and $X^3$, which are plural, are independent from each other, and when m is 2 or more, $X^4$ and $X^5$, which are plural, are independent from each other).

7. The secondary battery according to claim 1, wherein the content of the fluorinated ether in the non-aqueous electrolytic solvent is from 50 to 90% by volume.

8. The secondary battery according to claim 1, wherein in the Formula (1), the number of carbon atoms $n_1$ in $R_1$, and the number of carbon atoms $n_2$ in $R_2$, are respectively $1 \le n_1 \le 6$ and $1 \le n_2 \le 6$.

9. The secondary battery according to claim 1, wherein the sulfone compound is a cyclic sulfone compound represented by the following Formula (7-1):

(7-1)

(in Formula (7-1), $R_3$ represents substituted or unsubstituted alkylene group).

10. The secondary battery according to claim 1 comprising two or more types of sulfone compounds as the sulfone compound.

11. The secondary battery according to claim 1 comprising a cyclic sulfone compound and a chain sulfone compound as the sulfone compound.

12. The secondary battery according to claim 1, wherein the content of the sulfone compound in the non-aqueous electrolytic solvent is from 5 to 50% by volume.

13. The secondary battery according to claim 2, wherein the content of the carbonate ester compound in the non-aqueous electrolytic solvent is from 5 to 30% by volume.

14. The secondary battery according to claim 2, wherein the carbonate ester compound comprises at least ethylene carbonate.

15. The secondary battery according to claim 2, wherein the content of a cyclic sulfonate ester represented by the Formula (9) in the electrolyte solution is 0.01% by mass or more and 10% by mass or less.

16. The secondary battery according to claim 2, wherein the compound containing an N(SO$_2$F)$_2$ anion (FSI anion) represented by the Formula (B) is a salt with an alkali metal.

17. The secondary battery according to claim 2, wherein the compound containing an N(SO$_2$F)$_2$ anion (FSI anion) represented by the Formula (B) is a salt with Li.

18. A method for producing a secondary battery comprising an electrode element, an electrolyte solution, and an outer package, the method comprising the steps of:
producing the electrode element by placing a positive electrode and a negative electrode so as to be faced with each other, wherein the positive electrode is capable of absorbing and releasing lithium and has a positive electrode active material which operates at 4.5 V or more relative to lithium; and
encapsulating the electrode element, and the electrolyte solution which comprises a non-aqueous electrolytic solvent comprising a sulfone compound represented by the following Formula (1) and a fluorinated ether compound represented by the following Formula (2) into an outer package,
and wherein the content of the fluorinated ether compound in the non-aqueous electrolytic solvent is from 40 to 90% by volume:

(1)

(in Formula (1), R$_1$ and R$_2$ each independently represent substituted or unsubstituted alkyl group, a carbon atom of R$_1$ and a carbon atom of R$_2$ may be bonded through a single bond or double bond to form a cyclic structure);

(2)

(in Formula (2), R$_1$ and R$_2$ each independently represent alkyl group or fluorinated alkyl group, and at least one of R$_1$ and R$_2$ is fluorinated alkyl group).

19. The secondary battery according to claim 1, wherein the sulfone compound is at least one selected from the group consisting of tetramethylene sulfone, pentamethylene sulfone, hexamethylene sulfone, 2,4-dimethylsulfolane, ethylmethylsulfone, ethylisopropylsulfone, ethylisobutylsulfone, dimethylsulfone, and diethylsulfone.

20. A secondary battery comprising a positive electrode capable of absorbing and releasing lithium, and an electrolyte solution comprising a non-aqueous electrolytic solvent,
wherein the positive electrode has a positive electrode active material which operates at 4.5 V or more versus lithium, and
wherein the non-aqueous electrolytic solvent comprises a sulfone compound represented by the following Formula (1) and a fluorinated ether compound represented by the following Formula (2),
and wherein the sulfone compound comprises two or more types of sulfone compounds,
and wherein the content of the fluorinated ether compound in the non-aqueous electrolytic solvent is from 40 to 90% by volume:

(1)

(in Formula (1), R$_1$ and R$_2$ each independently represent substituted or unsubstituted alkyl group a carbon atom of R$_1$ and a carbon atom of R$_2$ may be bonded through a single bond or double bond to form a cyclic structure);

(2)

(in Formula (2), R$_1$ and R$_2$ each independently represent alkyl group or fluorinated alkyl group, and at least one of R$_1$ and R$_2$ is fluorinated alkyl group).

21. The secondary battery according to claim 20, wherein the sulfone compound comprises a cyclic sulfone compound and a chain sulfone compound.

* * * * *

UNITED STATES PATENT AND TRADEMARK OFFICE
CERTIFICATE OF CORRECTION

PATENT NO. : 9,905,887 B2  
APPLICATION NO. : 14/405798  
DATED : February 27, 2018  
INVENTOR(S) : Takahashi et al.

Page 1 of 1

It is certified that error appears in the above-identified patent and that said Letters Patent is hereby corrected as shown below:

On the Title Page

Abstract, Line 1, "battery cg" should read --battery comprising--.

In the Claims

Claim 4, Column 32, Line 3, "Cu Y" should read --Cu, Y--.

Signed and Sealed this  
Fifth Day of June, 2018

Andrei Iancu  
*Director of the United States Patent and Trademark Office*